United States Patent
Xu et al.

(10) Patent No.: US 12,018,341 B2
(45) Date of Patent: Jun. 25, 2024

(54) METHOD FOR SMELTING LOW NITROGEN STEEL USING ELECTRIC FURNACE

(71) Applicant: BAOSHAN IRON & STEEL CO., LTD., Shanghai (CN)

(72) Inventors: Yingtie Xu, Shanghai (CN); Zhaoping Chen, Shanghai (CN); Chengbin Li, Shanghai (CN); Baoquan Yang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 647 days.

(21) Appl. No.: 17/278,594

(22) PCT Filed: Sep. 25, 2019

(86) PCT No.: PCT/CN2019/107837
§ 371 (c)(1),
(2) Date: Mar. 22, 2021

(87) PCT Pub. No.: WO2020/063671
PCT Pub. Date: Apr. 2, 2020

(65) Prior Publication Data
US 2021/0355555 A1    Nov. 18, 2021

(30) Foreign Application Priority Data
Sep. 27, 2018  (CN) .......................... 201811132581.9

(51) Int. Cl.
*C21C 5/52*  (2006.01)
*C21C 7/072*  (2006.01)

(52) U.S. Cl.
CPC ............ *C21C 5/5229* (2013.01); *C21C 7/072* (2013.01); *C21C 2005/5235* (2013.01); *C21C 2250/06* (2013.01)

(58) Field of Classification Search
CPC ........ C21C 2005/5235; C21C 2250/06; C21C 5/5217; C21C 5/5229; C21C 5/527; C21C 7/072; C21C 5/48; C21C 5/5252; C21C 7/064; C21C 7/068; F27B 3/04; F27B 3/085; F27B 3/22; F27B 14/02; F27B 3/10; Y02P 10/20
See application file for complete search history.

(56) References Cited

U.S. PATENT DOCUMENTS 10,808,290 B2 *  10/2020  Zhu .................... C21C 7/0025

FOREIGN PATENT DOCUMENTS

CN    103361465 A  *  10/2013

* cited by examiner

*Primary Examiner* — Quang T Van
(74) *Attorney, Agent, or Firm* — Amster, Rothstein & Ebenstein LLP

(57) ABSTRACT

A method is disclosed for smelting low nitrogen steel using a dual-shell electric furnace having two furnace shells and an arc power system for alternatively electrically heating the furnace shells in which one of the two furnace shells is respectively sequentially subjected to electric heating, feeding, sealing of a molten pool and blowing of a combustion medium and oxygen to initiate smelting; when the temperature of molten steel in the furnace shell subjected to electric heating reaches a target temperature, initiating electric heating of the other furnace shell. The method can shorten the smelting period and improve the throughput of a production line of an electric furnace to efficiently meet the market requirements for low nitrogen steel while reducing the emission of environmental pollutants associated with known processes.

11 Claims, No Drawings

METHOD FOR SMELTING LOW NITROGEN STEEL USING ELECTRIC FURNACE

TECHNICAL FIELD

The present disclosure relates to a smelting method, and particularly relates to a method fir smelting low nitrogen steel.

BACKGROUND

Electric furnace steelmaking mainly utilizes scrap steel resources to smelt, is low in degree of dependence on molten iron, and is a steelmaking method which is low in carbon emission and environmentally friendly. However, compared to converter steelmaking, electric furnace steelmaking has two defects as follows: 1, the smelting period is long, and electric furnace steelmaking is very difficult to conform to the requirements on high-efficiency continuous casting and particularly high-efficiency slab continuous casting; and 2, steel smelted by an electric furnace is high in nitrogen content which is generally higher than 30 ppm, making it impossible to smelt high-end steel having limit on the nitrogen content. The two defects seriously restrict development of electric furnace steelmaking, and currently, the annual output of one electric furnace steelmaking production line hardly exceeds 1.5 million tons.

In the prior art, in order to improve production efficiency of electric furnace steelmaking, a technology of adding part of molten iron, a scrap steel preheating and continuous feeding technology, and an enhanced oxygen blowing and combustion supporting technology are developed. However, when the molten iron is added, a furnace cover of the electric furnace needs to be opened, resulting in that the smelting period is prolonged. The scrap steel preheating and continuous feeding technology has the problems of presence of dioxin and difficulty in maintenance of related preheating equipment. The enhanced oxygen blowing and combustion supporting technology is a key technology development direction at present.

Chinese Patent Application with the patent publication number CN107502702A, published on Dec. 22, 2017 and entitled "Clean and Rapid Smelting Method in Electric Arc Furnace with Full Scrap Steel", discloses a clean and rapid smelting method in an electric arc furnace with full scrap steel. In the method, a blowing gun embedded inside a refractory material on the lateral surface of the bottom of an electric arc furnace to blow different types of media in different smelting stages and carburization in a molten pool is utilized in a carburetting smelting-assisting stage to accelerate melting-down and improve carbon content of the molten pool so as to finally fulfill the rapid smelting aim, but the embedded type blowing gun is difficult to maintain and production stability is very difficult to maintain.

Chinese Patent Application with the patent publication number CN101899548A, published on Dec. 1, 2010, entitled "Novel Process for Scrap Steel Preheating and Premelting and Efficient Electric Furnace Steelmaking", discloses that firstly, scrap steel is molten by an inductance furnace and then the molten steel is added into an electric furnace for smelting. The electric furnace smelting period can be shortened, but the inductance furnace is high in energy consumption and long in smelting period, resulting in that the inductance furnace is not matched with the production rhythm of the electric furnace.

In view of this, it is expected to obtain an electric furnace steelmaking method which not only can solve the problem of long smelting period, but also can smelt low nitrogen steel so as to meet requirements of the market for high-end steel.

SUMMARY

The present disclosure aims to provide a method for efficiently smelting low nitrogen steel by using an electric furnace. The method not only can solve the problem of long smelting period, but also smelt low nitrogen steel so as to meet requirements of the market for high-end steel.

In order to fulfill the above aim, the present disclosure discloses a method for efficiently smelting low nitrogen steel by using an electric furnace. According to the method, a dual-shell electric furnace is adopted to carry out smelting, wherein the dual-shell electric furnace is provided with two furnace shells and an arc power system; steps of feeding, sealing of a molten pool, blowing of a combustion medium and oxygen and electric heating are respectively and sequentially carried out in the two furnace shells, the two furnace shells are subjected to electric heating alternately by the arc power system, when electric heating is carried out on one of the two furnace shells, the steps of feeding, sealing of the molten pool and blowing of the combustion medium and oxygen are sequentially carried out in the other furnace shell; and when the temperature of molten steel in the furnace shell subjected to electric heating reaches a target temperature of 1,600-1,660□, electric heating beings to be carried out on the other furnace shell. The term "alternately" herein refers to a case that the arc power system can only carry out electric heating on one furnace shell each time, and cannot simultaneously carry out electric heating on the two furnace shells. When the arc power system carries out electric heating on one of the furnace shells, tasks of feeding, sealing of the molten pool, blowing of the combustion medium, blowing of oxygen and the like have been finished in the furnace shell.

In the technical solution of the present disclosure, the dual-shell electric furnace is adopted to carry out smelting, the dual-shell electric furnace is provided with the two furnace shells, the two furnace shells are alternately subjected to electric heating by the arc power system, wherein when electric heating is carried out on one of the two furnace shells, feeding, sealing of the molten pool and blowing of the combustion medium and oxygen are sequentially carried out in the other furnace shell to start smelting; and when the molten steel in the furnace shell subjected to electric heating reaches the target temperature, electric heating starts to be carried out on the other furnace shell, so that the smelting period is greatly shortened, and the production efficiency is improved.

In addition, in some embodiments, the molten steel smelting capacity of each furnace shell may be 100-250 t. In addition, both a furnace door of the dual-shell electric furnace and an electrode port of the arc power system can be provided with automatic sealing furnace covers. In the step of sealing of the molten pool, the molten pool may be sealed in the following manner: that the furnace cover of the dual-shell electric furnace, a furnace door cover and an electrode port cover are closed and a feeding opening is isolated from the molten pool by a separator so as to reduce release of dust and smoke, thereby protecting the environment. In addition, in the step of sealing of the molten pool, the molten pool may be isolated from the outside air, so that carbon oxide released in the subsequent step of blowing of the combustion medium and oxygen to start smelting maintains nitrogen in the molten pool at a low level; and in the entire step of blowing of the combustion medium and oxygen, only denitrification is implemented, but nitrogen is not increased, thereby benefiting smelting of the low nitrogen steel. It should be noted that the combustion medium may be fuel gas or fuel oil, or may be a mixture of the fuel gas and the fuel oil. In addition, in some embodiments, before the step of blowing of the combustion medium, a dust removal device integrated with the dual-shell electric furnace can be started so as to reduce the discharge of dust and smoke, thereby protecting the environment.

In the step of feeding, in some embodiments, feeding may be carried out in the following manner: adding a small amount of light and thin scrap steel, cokes and a small amount of lime, then adding molten iron and finally adding common scrap steel according to the volume of the molten pool. In some other embodiments, the molten iron can also be replaced with direct reduced iron or pig iron, in this case, the direct reduced iron or the pig iron can be placed on the light and thin scrap steep and then added in the same material basket together with the light and thin scrap steel so as to save feeding time and prevent the direct reduced iron or the pig iron from excessively entering the molten pool to avoid freeze of the furnace bottom. In addition, in some embodiments, in the alternative and circular steelmaking process of the two furnace shells, a certain amount (in some embodiments, 30 to 40 t) of molten steel and steel slag can be left in the furnace after tapping from each furnace shell, and this is because the residual molten steel and the residual slag can prevent a case that furnace slag enters a steel ladle in the tapping process to cause a high deoxidation load of the subsequent process. In addition, more importantly, the residual molten steel and the residual slag can save the amount of the steel slag required by the next process of smelting steel, and the residual molten steel may be utilized to melt the scrap steel so as to improve the heat efficiency of melting the scrap steel.

In addition, the adding the small amount of light and thin scrap steel is to ensure that in the subsequent molten iron adding process, a fierce reaction cannot be performed between the residual steel molten steel and residual slag with high temperatures and high oxidability and molten iron, thereby avoiding serious splashing. The adding amount of the light and thin scrap steel should meet the requirement that the light and thin scrap steel can just cover the residual molten steel and the residual slag. In the process of adding the light and thin scrap steel, the cokes and the small amount of lime can be added along with the material basket of the light and thin scrap steel, and in some other embodiments, the cokes and the small amount of lime can also be added from a feed bin.

Then, the molten iron is added, and because the amount of the light and thin scrap steel in the molten pool is small, the molten iron added can rapidly drown a scrap steel layer and can be rapidly in contact with liquid unmade molten steel instead of being in contact with chaotic scrap steel, so that splashing of the molten iron is reduced, and the amount of the released dust and smoke is also greatly reduced, thereby also increasing the molten iron adding speed. In addition, the most importantly, the molten iron adding speed is increased, the splashing amount is reduced, and after being added, the molten iron directly enters the liquid molten pool, so that the nitrogen absorption amount is greatly reduced and it is also beneficial for improving metal yield of the molten iron.

Further, in the method for smelting the low nitrogen steel by using the electric furnace, which is disclosed by the present disclosure, the arc power system is a DC arc power system.

In the technical solution of the present disclosure, preferably, the arc power system is the DC arc power system so as to guarantee stable work of the arc power system, meet ultrahigh-power power supply and reduce power consumption, impact to a power grid and melting loss of the furnace wall. Certainly, in some other embodiments, the arc power system also may be an AC arc power system.

Further, in the method for smelting the low nitrogen steel by using the electric furnace, which is disclosed by the present disclosure, the rated power of the DC electric-arc power supply system is 0.7 to 1 megawatt per ton of molten steel so as to accelerate melting of the molten steel. The unit of the rated power is also represented by "MW per ton of molten steel" in the present application.

Further, in the method for smelting the low nitrogen steel by using the electric furnace, which is disclosed by the present disclosure, the DC are power system is provided with a hollow argon blowing electrode, wherein a bottom electrode of the hollow argon blowing electrode is a flake electrode.

In this preferred technical solution, the DC electric-arc power supply system is provided with the hollow argon blowing electrode, wherein the bottom electrode is the flake electrode so as to reduce electrode loss and facilitate maintenance.

Further, in the method for smelting the low nitrogen steel by using the electric furnace, which is disclosed by the present disclosure, argon blowing of the hollow argon blowing electrode is throughout the entire electric heating process, so that there is no nitrogen in the furnace shell.

In the technical solution of the present disclosure, after the electrode is powered on, the electrode port inevitably sucks air into a hearth, and thus, argon blowing of the hollow argon blowing electrode is throughout the entire electric heating process to ensure that an arc region does not contain nitrogen so as to avoid a case that an nitrogen in the molten steel is increased by arc.

Further, in the method for smelting the low nitrogen steel by using the electric furnace, which is disclosed by the present disclosure, an argon blowing flow of the hollow argon blowing electrode is controlled to be 50-100 standard liters per minute (in the present application, "standard liters per minute" is also represented by "NL/min") so as to ensure that the arc is stable. When the argon blowing flow is greater than 100 NL/min, the arc can be unstable, and when the argon blowing flow is smaller than 50 NL/min, an effect of preventing nitrogen increase cannot be achieved.

Further, in the method for smelting the low nitrogen steel by using the electric furnace, which is disclosed by the present disclosure, 4 to 6 blowing guns for blowing the combustion medium and oxygen are arranged in each furnace shell, and an oxygen blowing flow of each blowing gun is 2,500-4,000 standard cubic meters per hour (in the present application, "standard cubic meters per hour" is also represented by "$Nm^3/h$"). The range of the oxygen blowing flow herein is determined according to the required decarburization speed and production stability. When the flow is greater than 4,000 $Nm^3/h$, the violent reaction can be caused to influence production; and when the flow is smaller than 2,500 $Nm^3/h$, the low decarburization speed can be caused.

Further, in the method for smelting the low nitrogen steel by using the electric furnace, which is disclosed by the present disclosure, in the step of blowing of the combustion medium and oxygen, after simultaneously blowing combustion medium and oxygen for 5 to 10 minutes, blowing oxygen only to start decarburization smelting.

In the technical solution of the present disclosure, in the step of blowing of the combustion medium and oxygen, after simultaneously blowing combustion medium and oxygen for 5 to 10 minutes, blowing oxygen only to start decarburization smelting, and the consideration focuses on that in the early smelting process, a great amount of scrap steel is accumulated at front ends of nozzles, energy released by combustion when the combustion medium and oxygen are simultaneously blown can be well absorbed by the scrap steel and can melt the scrap steel, and after 5-10 min, the scrap steel layer at the front ends of the nozzles is melted, but if fuel gas is continuously blown, the heat efficiency will be greatly reduced. Therefore, after the combustion medium and oxygen are simultaneously blown for 5-10 min, only oxygen is blown to carry out decarburization smelting.

Further, in the method for smelting the low nitrogen steel by using the electric furnace, which is disclosed by the present disclosure, when electric heating is carried out on the furnace shell, a slagging material is added into the furnace shell to form foam slag; and after the foam slag is formed, the oxygen blowing flow is adjusted according to a carbon content of steel, i.e., when the carbon content is smaller than 0.5%, the oxygen blowing flow is reduced to 40% to 60% of the oxygen blowing flow when the carbon content is greater than 0.5%, until smelting is finally finished.

In the technical solution of the present disclosure, when electric heating is carried out on the furnace shell, the tasks of slagging dephosphorization, oxygen blowing decarburization and warming need to be completed. Specifically, after electric heating is carried out on the furnace shell for 5-10 min, the slagging material including the lime and dolomite is added into the furnace shell to form foam slag so as to carry out dephosphorization, thereby increasing the MgO content of furnace slag and preventing corrosion to a refractory material. After the foam slag is formed, the oxygen blowing flow is adjusted according to the carbon content of the steel, i.e., when the carbon content is smaller than 0.5%, the oxygen blowing flow is reduced to 40% to 60% of the previous oxygen blowing flow, until smelting is finally finished, so as to carry out decarburization.

Further, in the method for smelting the low nitrogen steel by using the electric furnace, which is disclosed by the present disclosure, in the step of feeding, the total carbon content of the steel is 1.5-2.5 wt % of a final quantity of molten steel after tapping; and because CO bubbles generated by decarburization can be used for denitrification, denitrification is implemented by decarburization to ensure that the nitrogen content of the molten steel after tapping is smaller than 25 ppm so as to achieve low nitrogen. When an electric furnace in the prior art is adopted, nitrogen content after tapping 40-60 ppm; the low nitrogen steel mentioned in the present application refers to steel the nitrogen content of which is lower than 30 ppm after tapping; and after electric furnace smelting is ended, the nitrogen content is lower than the nitrogen content of the molten steel after tapping, and thus, in this case, the nitrogen content of the molten steel after tapping is taken as the standard.

In the technical solution of the present disclosure, in order to enable two furnace shells to be matched with each other in the aspect of operating time so as to carry out electric heating on the two furnace shells alternately by the arc power system of the dual-shell electric furnace, in the step of feeding, the total carbon content of the molten steel is controlled to be 1.5 to 2.5 wt % of the final quantity of the molten steel after tapping.

Further, in the method for smelting the low nitrogen steel by using the electric furnace, which is disclosed by the present disclosure, in the step of feeding, at least one of the light and thin scrap steel and the direct reduced iron, the cokes and the lime can be firstly added, then the molten iron is added, and finally, the common scrap steel is added. Such feeding mode aims to thicken the furnace slag and effectively avoid splashing of the molten iron. There will be many residual furnace slag of the previous process of smelting steel and the residual furnace slag is high in oxidability, and thus, if the furnace slag is not thickened, in the process of adding the molten iron, carbon is liable to violently react with the furnace slag to cause splashing.

Compared to the prior art, the method for smelting the low nitrogen steel by using the electric furnace, which is disclosed by the present disclosure, has the following beneficial effects:

The method for efficiently smelting the low nitrogen steel by using the electric furnace, which is disclosed by the present disclosure, not only can shorten the smelting period and improve the throughput of an electric furnace production line, but also can achieve the low nitrogen steel so as to meet the requirements of the market for high-end steel. Moreover, the method for efficiently smelting the low nitrogen steel by using the electric furnace, which is disclosed by the present disclosure, can reduce the discharge of dust and smoke, thereby protecting the environment.

DETAILED DESCRIPTION

A method for efficiently smelting low nitrogen steel by using an electric furnace, which is disclosed by the present disclosure, will be further explained and illustrated below in combination with the specific embodiments, but the explanation and illustration do not constitute improper limitation to the technical solution of the present disclosure.

Embodiments 1-6

The smelting process of a method for efficiently smelting low nitrogen steel by using an electric furnace according to Embodiments 1-6 is as follows.

A dual-shell electric furnace is adopted to carry out smelting, wherein the dual-shell electric furnace is provided with two furnace shells, and the molten steel smelting capacity of each furnace shell is 100 to 250 t. When the capacity exceeds 250 t, casting may be influenced, i.e., the casting time is excessively long, so that the temperature of molten steel may be excessively low in the later period of casting to influence casting; and when the capacity is smaller than 100 t, the throughput may be influenced, resulting in failure of efficient production required by the present disclosure. The two furnace shells are alternately subjected to electric heating by a DC arc power system of the dual-shell electric furnace, the DC arc power system is provided with a hollow argon blowing electrode, a bottom electrode is a flake electrode, and a rated power is 0.7 to 1 MW per ton of molten steel. When electric heating is carried out on one of the two furnace shells, feeding, sealing of a molten pool and blowing of a combustion medium and oxygen are sequentially carried out in the other furnace shell to start smelting, and when the temperature of molten steel in the furnace shell subjected to electric heating reaches a target temperature of 1,600-1,660□, electric heating starts to be carried out on the other furnace shell. Argon blowing of the hollow argon blowing electrode is throughout the entire electric heating process, and an argon blowing flow of the hollow argon blowing electrode is controlled to be 50-100 In addition, both a furnace door of the dual-shell electric furnace and an electrode port of the DC arc power system are provided with automatic sealing furnace covers. 4 to 6 blowing guns for blowing the combustion medium and oxygen are arranged in each furnace shell. The combustion medium may be fuel gas or fuel oil, or may be a mixture of the fuel gas and the fuel oil.

In addition, in the step of feeding, at least one of a small amount (e.g., 10-20 t) of light and thin scrap steel and direct reduced iron, cokes and lime are added, then molten iron is added, and finally, common scrap steel is added according to the volume of the molten pool. The total carbon content of the molten steel is 1.5 to 2.5 wt % of a final quantity of molten steel after tapping, and the nitrogen content of the molten steel after tapping is smaller than 25 ppm.

In the step of sealing of the molten pool, the furnace cover of the dual-shell electric furnace, a furnace door cover and an electrode port cover are closed, and a feeding opening is isolated from the molten pool by a separator so as to reduce release of dust and smoke, thereby protecting the environment.

In the step of blowing of the combustion medium and oxygen to start smelting, before starting smelting, a dust removal device integrated with the dual-shell electric furnace is switched on so as to reduce the discharge of dust and smoke, thereby protecting the environment. Then, the combustion medium and oxygen are simultaneously blown as follows: the blowing guns simultaneously run, a total flow of the combustion medium blown by the blowing gun is 300-400 NL/h, and an oxygen blowing flow of one single blowing gun is 1,000 to 1,200 Nm$^3$/h, wherein in the first 2 min, the total flow of the combustion medium is controlled to be 180 to 240 NL/h. Timing is carried out from the moment when the combustion medium and oxygen are blown, after blowing is carried out for 5-10 min, blowing of the combustion medium is stopped, then only oxygen is blown to carry out decarburization smelting, and the oxygen blowing flow of one single blowing gun is 3,000 Nm$^3$/h.

When electric heating is carried out on the furnace shell, the tasks of slagging dephosphorization, oxygen blowing decarburization and warming are required to be completed. Specifically, a slagging material including lime and dolomite is added into the furnace shell in batches to form foam slag so as to carry out dephosphorization. After the foam slag is formed, the oxygen blowing flow is adjusted according to the carbon content of steel, i.e., when the carbon content is smaller than 0.5%, the oxygen blowing flow is reduced to 40% to 60% of the oxygen blowing flow when the carbon content is greater than 0.5%, until smelting is finally finished, so as to carry out decarburization. In addition, when all the scrap steel in the molten pool is molten, the furnace door cover is opened to enable dephosphorized slag to automatically flow out; then after electric heating is continued for 1 min, carbon powder is blown to maintain the foam slag; then electric heating is continued until the temperature of the molten steel reaches a target temperature of 1,600-1,660, and then a tapping state is present; and after tapping, there are 30 to 40 t of residual molten steel and residual slag.

Table 1-1 to Table 1-5 list specific process parameters used in the method for efficiently smelting the low nitrogen steel by using the electric furnace according to Embodiments 1-6.

TABLE 1-1

| Serial Number | Molten Steel Smelting Capacity (t) of Each Furnace Shell | Rated Power (MW per ton of molten steel) of DC Arc Power System | Step of Feeding | | |
|---|---|---|---|---|---|
| | | | Number (piece) of Blowing Guns in Each Furnace | Light and Thin Scrap Steel (t) | Coke (t) | Lime (t) |
| Embodiment 1 | 150 | 1 | 5 | 15 | 1 | 2 |
| Embodiment 2 | 200 | 0.9 | 5 | 20 | 1.2 | 2 |
| Embodiment 3 | 250 | 0.72 | 6 | 20 | 2 | 2.5 |
| Embodiment 4 | 100 | 1 | 4 | 10 | 1 | 1.8 |
| Embodiment 5 | 180 | 1 | 5 | 18 | 1.1 | 2 |
| Embodiment 6 | 220 | 0.82 | 6 | 20 | 1.8 | 2.3 |

TABLE 1-2

| Serial Number | Step of Feeding | | | | Step of Blowing of Combustion Medium and Oxygen |
|---|---|---|---|---|---|
| | Direct Reduced Iron (t) | Molten Iron (t) | Common Scrap Steel (t) | Percentage of Total Carbon Content of Molten Steel to Final Quantity of Molten Steel after Tapping (wt %) | Combustion Medium |
| Embodiment 1 | 0 | 60 | 90 | 2.1 | heavy oil |
| Embodiment 2 | 0 | 80 | 120 | 2.0 | heavy oil |
| Embodiment 3 | 20 | 90 | 140 | 2.4 | heavy oil |
| Embodiment 4 | 0 | 40 | 60 | 2.4 | liquid gas |
| Embodiment 5 | 0 | 72 | 108 | 2.0 | liquid gas |
| Embodiment 6 | 0 | 95 | 130 | 2.3 | liquid gas |

Wherein the combustion medium mainly adopts heavy oil or liquid gas, so that cost can be saved, hut other natural gas can also be adopted in the technical solution of the present application.

TABLE 1-3

| | Step of Blowing of Combustion Medium and Oxygen | | | | |
|---|---|---|---|---|---|
| Serial Number | Total Flow (NL/h) of Combustion Medium Blown by All Blowing Guns | Total Flow (NL/h) of Combustion Medium in First 2 min | Time (min) of Blowing Combustion Medium | Flow (Single Blowing Gun, $Nm^3/h$) of Oxygen Blown Simultaneously with Combustion Medium | Flow ($Nm^3/h$) of Oxygen Blown by Single Blowing Gun in Process of Only Blowing Oxygen for Decarburization Smelting |
| Embodiment 1 | 300 | 180 | 8 | 1000 | 3000 |
| Embodiment 2 | 400 | 200 | 9 | 1200 | 3600 |
| Embodiment 3 | 400 | 240 | 10 | 1200 | 4000 |
| Embodiment 4 | 300 | 180 | 8 | 1000 | 3000 |
| Embodiment 5 | 350 | 190 | 9 | 1100 | 3300 |
| Embodiment 6 | 400 | 220 | 9 | 1200 | 3600 |

TABLE 1-4

| | Step of Electric Heating | | | |
|---|---|---|---|---|
| Serial Number | Lime (t) | Dolomite (t) | Batch Adding Number (batch) | Percentage (%) of Oxygen Blowing Flow to Previous Oxygen Blowing Flow when Carbon Content is Smaller Than 0.5% |
| Embodiment 1 | 4 | 1 | 3 | 40 |
| Embodiment 2 | 5 | 1.2 | 3 | 50 |
| Embodiment 3 | 6 | 1.5 | 4 | 60 |
| Embodiment 4 | 3 | 0.6 | 2 | 40 |
| Embodiment 5 | 5 | 0.8 | 3 | 45 |
| Embodiment 6 | 5.5 | 1.3 | 4 | 55 |

The "batch adding number" herein does not require the same feeding amount in different batches, depending on the specific smelting furnace slag condition. Generally, the lime and the dolomite are mixed and then the mixture is added in batches; or it can be that the lime is added first, and then the dolomite is added.

TABLE 1-5

| | Step of Electric Heating | | | |
|---|---|---|---|---|
| Serial Number | Residual Molten Steel and Residual Slag (t) after Tapping | Target Temperature(□) of Molten Steel | Nitrogen Content (ppm) of Molten Steel after Tapping | Argon Blowing Flow (NL/min) of Hollow Argon Blowing Electrode |
| Embodiment 1 | 35 | 1620 | 20 | 60 |
| Embodiment 2 | 40 | 1620 | 22 | 60 |
| Embodiment 3 | 40 | 1640 | 24 | 100 |
| Embodiment 4 | 30 | 1635 | 25 | 50 |
| Embodiment 5 | 38 | 1620 | 21 | 60 |
| Embodiment 6 | 40 | 1640 | 24 | 80 |

TABLE 2

| | Tapping Quantity (t) | Time (min) of Each Furnace Shell from Feeding to Tapping finished | Smelting Period (min) | Annual Output (ten thousand tons) |
|---|---|---|---|---|
| Embodiment 1 | 150 | 60 | 30 | 200 |
| Embodiment 2 | 200 | 66 | 33 | 240 |
| Embodiment 3 | 250 | 72 | 36 | 270 |
| Embodiment 4 | 100 | 50 | 25 | 160 |
| Embodiment 5 | 180 | 64 | 32 | 220 |
| Embodiment 6 | 220 | 68 | 34 | 260 |

By adopting the smelting method according to the technical solution of the present disclosure, the tapping quantity is 100 t-250 t, and the annual output can reach 1.6-2.7 million tons, while the maximum annual output of an existing furnace is 1.2 million tons, and the average annual output of the existing furnace is smaller than 900,000 tons. The smelting period in the technical solution of the present application is 25-36 min, while the average smelting period of a common dual-shell furnace is 56 min.

Table 2 lists the tapping quantity, consumed time, the smelting period and the annual output in the method for efficiently smelting the low nitrogen steel by using the electric furnace according to Embodiments 1-6.

Thus, it can seen that the method for efficiently smelting the low nitrogen steel by using the electric furnace, which is disclosed by the present disclosure, not only can shorten the smelting period and improve the throughput of an electric furnace production line, but also can smelt the low nitrogen steel so as to meet the requirements of the market for high-end steel. Moreover, the method for efficiently smelting the low nitrogen steel by using the electric furnace, which is disclosed by the present disclosure, can reduce the discharge of dust and smoke, thereby protecting the environment.

It should be noted that in the scope of protection of the present disclosure, the prior art part is not limited to the embodiments provided by the present application, and all the prior arts without confliction with the solution of the present disclosure, including, but not limited to, the prior patent literatures, the prior publications, prior publication use and the like, all shall fall within the scope of protection of the present disclosure.

In addition, the combination mode of technical features in the present disclosure is not limited to the combination modes recorded in claims or the combination modes recorded in the specific embodiments, and all the technical features recorded in the present disclosure can be freely combined or integrated in any way, unless there is confliction between them.

It further should be noted that the foregoing embodiments merely are specific embodiments of the present disclosure. It is obvious that the present disclosure is not limited to the above embodiments, and similar variations or modifications, which can be directly obtained or easily conceived by those skilled in the art accordingly from the contents disclosed by the present disclosure, all shall fall within the scope of the present disclosure.

The invention claimed is:

1. A method for smelting low nitrogen steel by using an electric furnace, wherein a dual-shell electric furnace is adopted to carry out smelting, and the dual-shell electric furnace is provided with two furnace shells and an arc power system; and the method comprises carrying out steps of feeding, sealing of a molten pool, blowing of a combustion medium and oxygen and electric heating respectively and sequentially in the two furnace shells, specifically, carrying out electric heating on the two furnace shells alternately by the arc power system, when electric heating is carried out on one of the two furnace shells, sequentially carrying out the steps of feeding, sealing of the molten pool and blowing of the combustion medium and oxygen in the other furnace shell, and when the temperature of molten steel in the furnace shell subjected to electric heating reaches a target temperature of 1,600-1,660° C., starting to carry out electric heating on the other furnace shell.

2. The method for smelting the low nitrogen steel by using the electric furnace of claim 1, wherein the arc power system is a DC arc power system.

3. The method for smelting the low nitrogen steel by using the electric furnace of claim 2, wherein the DC arc power system has a rated power of 0.7 to 1 MW per ton of molten steel.

4. The method for smelting the low nitrogen steel by using the electric furnace of claim 2, wherein the DC arc power system is provided with a hollow argon blowing electrode, and a bottom electrode of the hollow argon blowing electrode is a flake electrode.

5. The method for smelting the low nitrogen steel by using the electric furnace of claim 4, wherein argon blowing of the hollow argon blowing electrode is throughout the entire electric heating process.

6. The method for smelting the low nitrogen steel by using the electric furnace of claim 5, wherein an argon blowing flow of the hollow argon blowing electrode is controlled to be 50-100 standard liters per minute.

7. The method for smelting the low nitrogen steel by using the electric furnace of claim 1, wherein each of the furnace shells is provided with 4 to 6 blowing guns for blowing the combustion medium and oxygen, and an oxygen blowing flow of each blowing gun is 2,500-4,000 standard cubic meters per hour.

8. The method for smelting the low nitrogen steel by using the electric furnace of claim 1, wherein the step of blowing the combustion medium and oxygen further comprises simultaneously blowing the combustion medium and oxygen for 5-10 min, and then only blowing oxygen to carry out decarburization smelting.

9. The method for smelting the low nitrogen steel by using the electric furnace of claim 1, wherein when electric heating is carried out on the furnace shell, a slagging material is added into the furnace shell to form foam slag; and after the foam slag is formed, the oxygen blowing flow, according to the carbon content of steel, is adjusted as follows: when the carbon content is smaller than 0.5%, the oxygen blowing flow is reduced to 40% to 60% of the oxygen blowing flow when the carbon content is greater than 0.5%, until smelting is finally finished.

10. The method for smelting the low nitrogen steel by using the electric furnace of claim 1, wherein in the step of feeding, a total carbon content of the molten steel is 1.5-2.5 wt % of a final quantity of the molten steel after tapping, and the nitrogen content of the molten steel after tapping is smaller than 25 ppm.

11. The method for smelting the low nitrogen steel by using the electric furnace of claim 1, wherein the step of feeding comprises firstly, adding at least one of light and thin scrap steel and direct reduced iron, cokes and lime, then adding molten iron, and finally, adding common scrap steel.

\* \* \* \* \*